US008336307B2

(12) United States Patent
Teng

(10) Patent No.: US 8,336,307 B2
(45) Date of Patent: Dec. 25, 2012

(54) HIGH TORQUE OUTPUT DRIVE SYSTEM

(76) Inventor: Wu-Ere Teng, Kaohsiung County (TW)

( * ) Notice: Subject to any disclaimer, the term of this patent is extended or adjusted under 35 U.S.C. 154(b) by 379 days.

(21) Appl. No.: 12/814,874

(22) Filed: Jun. 14, 2010

(65) Prior Publication Data

US 2011/0146257 A1 Jun. 23, 2011

(30) Foreign Application Priority Data

Dec. 23, 2009 (TW) ............................... 98144462 A

(51) Int. Cl.
*F03B 17/02* (2006.01)
*F01D 23/00* (2006.01)
*F03D 11/00* (2006.01)

(52) U.S. Cl. ................... 60/495; 60/496; 415/5; 415/92

(58) Field of Classification Search ............ 60/495–496; 415/5, 92
See application file for complete search history.

(56) References Cited

U.S. PATENT DOCUMENTS 4,083,826 A * 4/1978 Albright ....................... 523/506
4,713,937 A * 12/1987 De Shon ......................... 60/495
7,216,483 B2 * 5/2007 Takeuchi ........................ 60/495

* cited by examiner

*Primary Examiner* — Thomas Denion
*Assistant Examiner* — Brian Inacay
(74) *Attorney, Agent, or Firm* — Brinks Hofer Gilson & Lione

(57) ABSTRACT

A high torque output drive system includes a fluid tank that stores a fluid, an array of weighted members disposed in series such that leading and trailing subarrays thereof are respectively placed along left and right running routes in the fluid tank, upper and lower direction reversing guide units respectively defining upper and lower guide routes each of which interconnects the left and right running routes, a fluid pump operable to move the fluid such that levels of the fluid in left and right columnar regions of the fluid tank are variable to result in generation of a buoyant force for lessening the weight of the trailing subarray so as to induce synchronized downward and upward movements of the leading and trailing subarrays, and a force-output shaft coupled to the weighted members by a gear train unit and revolvable to provide a high torque for a desired end use.

12 Claims, 11 Drawing Sheets

HIGH TORQUE OUTPUT DRIVE SYSTEM

CROSS-REFERENCE TO RELATED APPLICATION

This application claims priority of Taiwanese Patent Application No. 098144462, filed on Dec. 23, 2009, the disclosure of which is herein incorporated by reference.

BACKGROUND OF THE INVENTION

1. Field of the Invention

This invention relates to a high torque output drive system, more particularly to an output drive system which utilizes a fluid, such as water, to provide a high torque to a force-output shaft for outputting rotational energy for a desired end use.

2. Description of the Related Art

With the fast development of high technology in recent years, there are growing demands for electricity. Nowadays, electricity is generated mainly from nuclear energy and fossil energy. However, there are ensuing problems, such as generation of an ozone hole, global warming, nuclear waste disposal, radioactive waste and substances, etc. In view of foreseeable energy shortage and the global awareness of environmental protection, finding new non-polluting substitute energy sources has become an imperative, and techniques of using solar energy, wind, and hydraulic power have been proposed, such as those disclosed in U.S. Pat. Nos. 7,083,536, 6,227,803, and 5,230,215. However, electricity generation using such natural resources is unstable and inefficient.

SUMMARY OF THE INVENTION

An object of the present invention is to provide a high torque output drive system which utilizes the buoyant force of a fluid, such as water, to induce cyclical movement of a looped chain unit so as to provide a high torque to a force-output shaft for outputting rotational energy for a desired end use.

According to this invention, the high torque output drive system includes a fluid tank, a looped chain unit, upper and lower direction reversing guide units, a fluid pump, a force-output shaft, and a gear train unit.

The fluid tank includes an upper region, a lower region serving as a reservoir for storing a fluid, and a sub-chamber including left and right columnar regions in non-communication with each other and in fluid communication with the reservoir. The left and right columnar regions are configured to define left and right running routes, respectively.

The looped chain unit includes an array of weighted members disposed one after another in series in a lengthwise direction. The array of weighted members has leading and trailing subarrays that are displaced from each other in the lengthwise direction.

The upper and lower direction reversing guide units are disposed respectively in the upper and lower regions, and respectively define upper and lower guide routes each of which interconnects the left and right running routes. Once the looped chain unit is carried forward by the upper and lower direction reversing guide units to move along the upper and lower guide routes, the leading and trailing subarrays are respectively placed along the left and right running routes.

The fluid pump is operable to move the fluid in the reservoir towards the right columnar region such that a fluid level in the right columnar region is higher than that in the left columnar region and such that a buoyant force is generated in the right columnar region as a result of a difference in fluid level between the left and right columnar regions to lessen the weight of the trailing subarray disposed along the right running route so as to render the leading subarray heavier than the trailing subarray, thereby inducing synchronized downward and upward movements of the leading and trailing subarrays.

The force-output shaft is rotatably mounted on the fluid tank. The gear train unit is configured to couple the leading and trailing subarrays to the force-output shaft such that a translational force of the downward and upward movements of the leading and trailing subarrays is taken up at the right and left running routes to drive the force-output shaft to revolve about the revolving axis.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
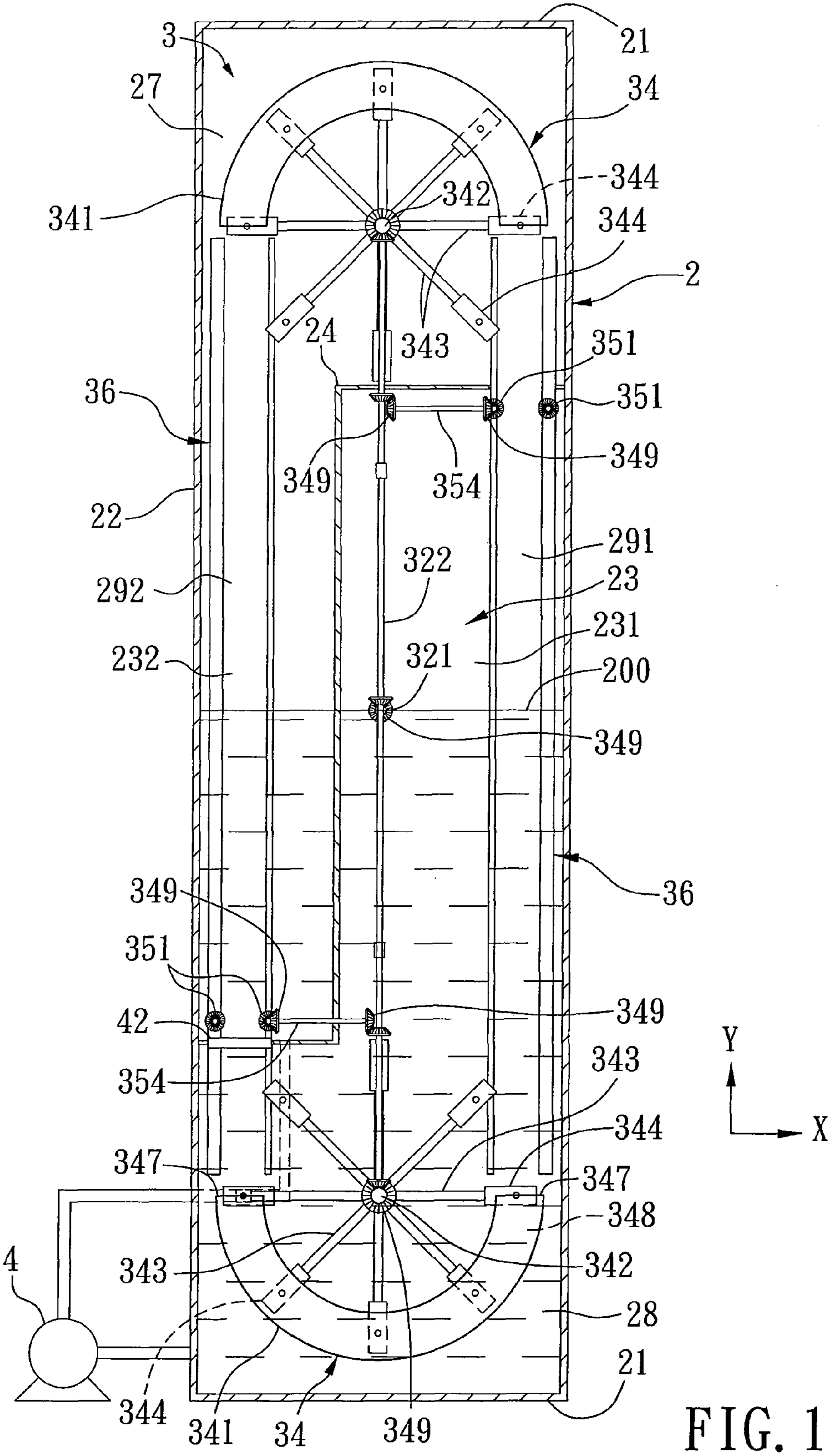
FIG. 1 is a schematic front view of the first preferred embodiment of a high torque output drive system according to this invention.

Referring to FIG. 1, the first preferred embodiment of a high torque output drive system according to the present invention is shown to comprise a fluid tank 2, a high-torque generating mechanism 3, and a fluid pump 4.

Figure 2:
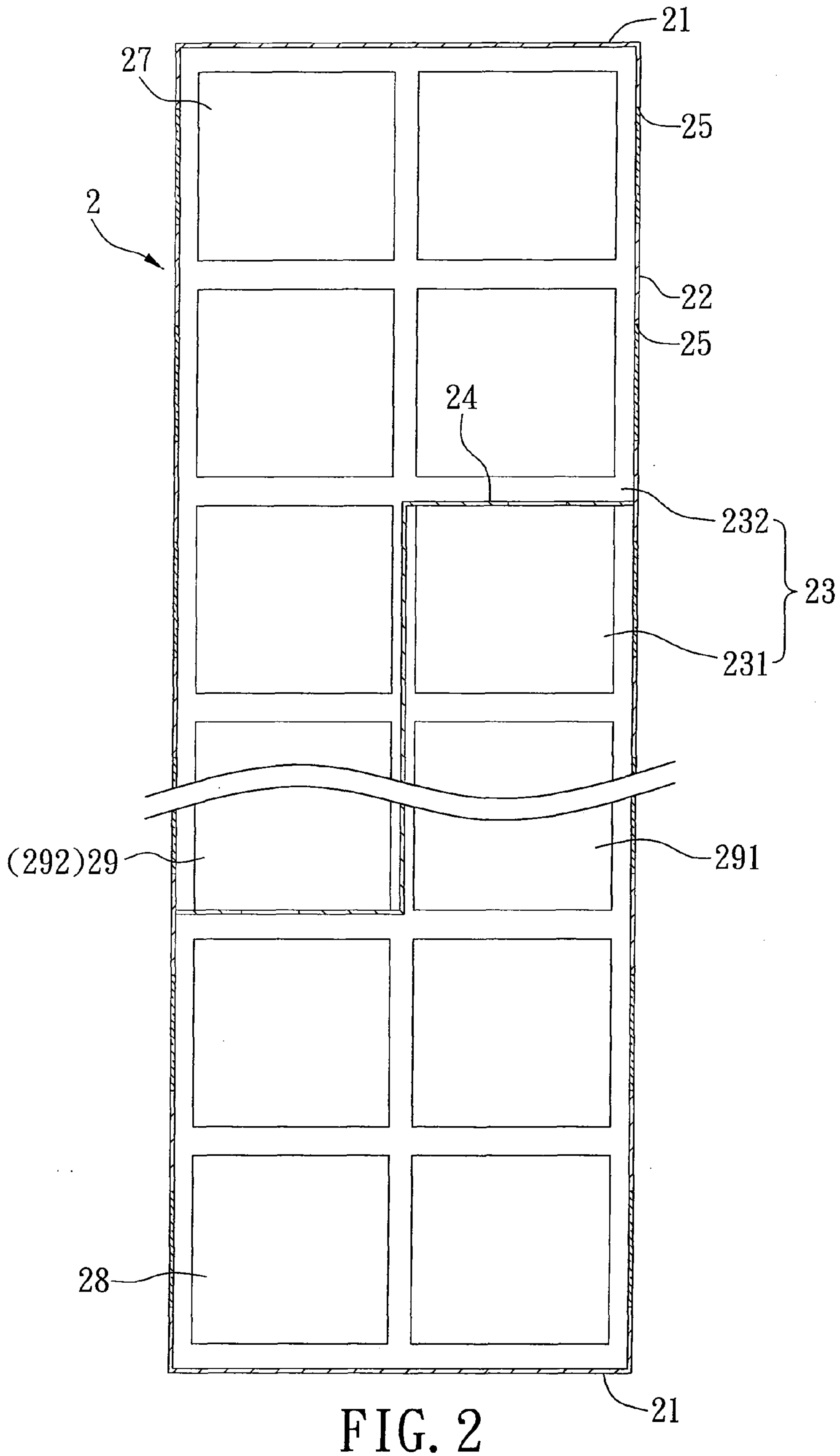
FIG. 2 is a fragmentary, partly sectional view of a fluid tank of the first preferred embodiment.
Figure 7:
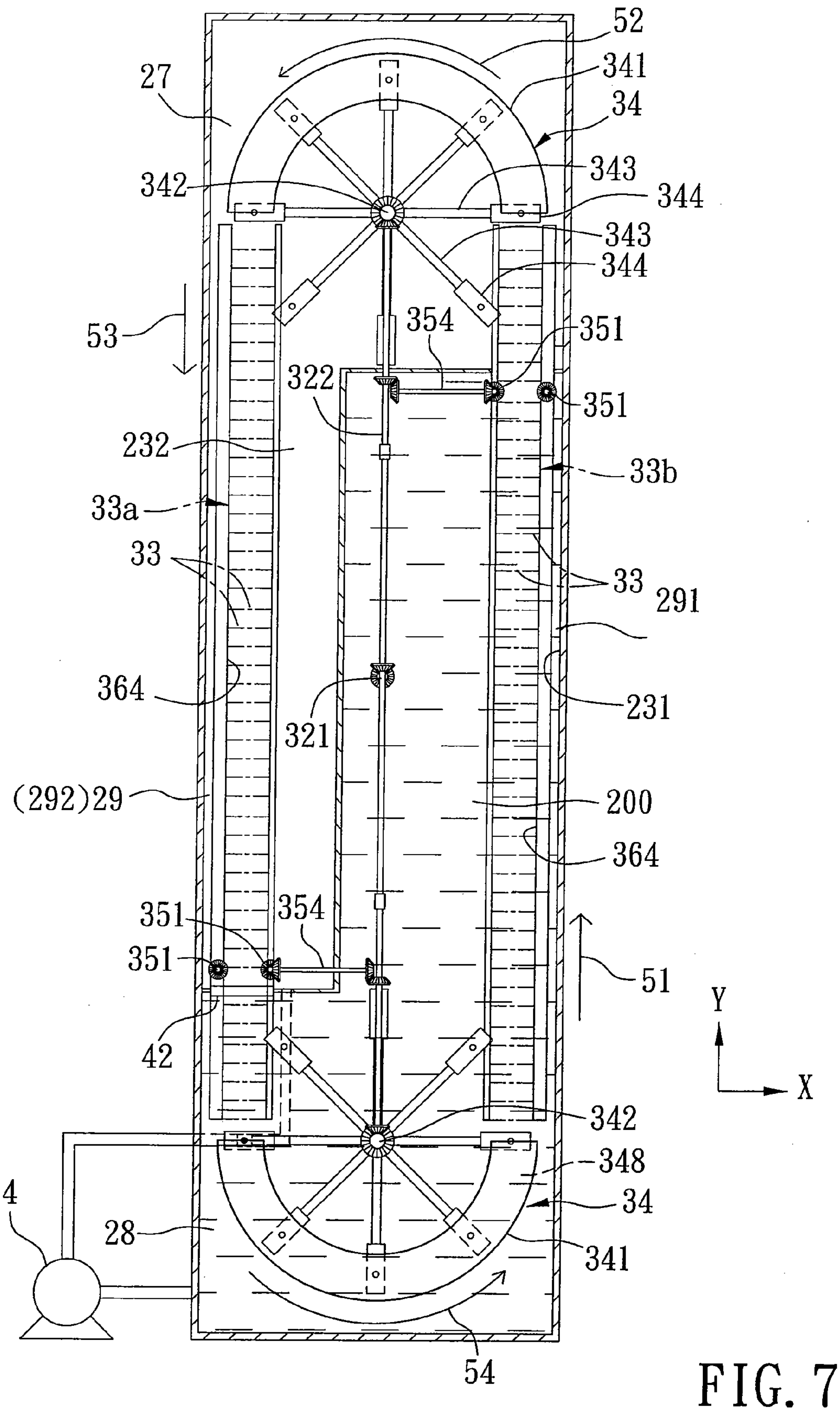
FIG. 7 is a schematic front view of the first preferred embodiment in a state of operation.

Referring to FIGS. 1 and 2, the fluid tank 2 includes top and bottom tank walls 21 opposite to each other in an upright direction (Y), and a surrounding wall 22 interposed between the top and bottom tank walls 21 and cooperating therewith to define an upright fluid chamber 23. Furthermore, the fluid tank 2 has an upper region 27 disposed at the top tank wall 21, a lower region 28 disposed at the bottom tank wall 21, and a sub-chamber 29 interposed between the upper and lower regions 27,28 and having left and right columnar regions 292, 291. The lower region 28 serves as a reservoir for storing a fluid 200, such as water. A partition wall 24 is disposed to partition the upright fluid chamber 23 into a first compartment 231 that includes the lower region 28 and the right columnar region 291, which are in fluid communication with each other, and a second compartment 232 having the upper region 27 and the left columnar region 292, which are in fluid communication with each other, such that the left and right columnar regions 292,291 are disposed opposite to, and are in non-communication with, each other in a first transverse direction (X) relative to the upright direction. The surrounding wall 22 has a plurality of transparent windows 25 to permit viewing of the interior of the fluid tank 2. A fluid pump 4 is operable to move the fluid 200 in the reservoir 28 towards the right columnar region 291 such that a fluid level in the right columnar region 291 is higher than that in the left columnar region 292, as shown in FIG. 7.

Figure 3:
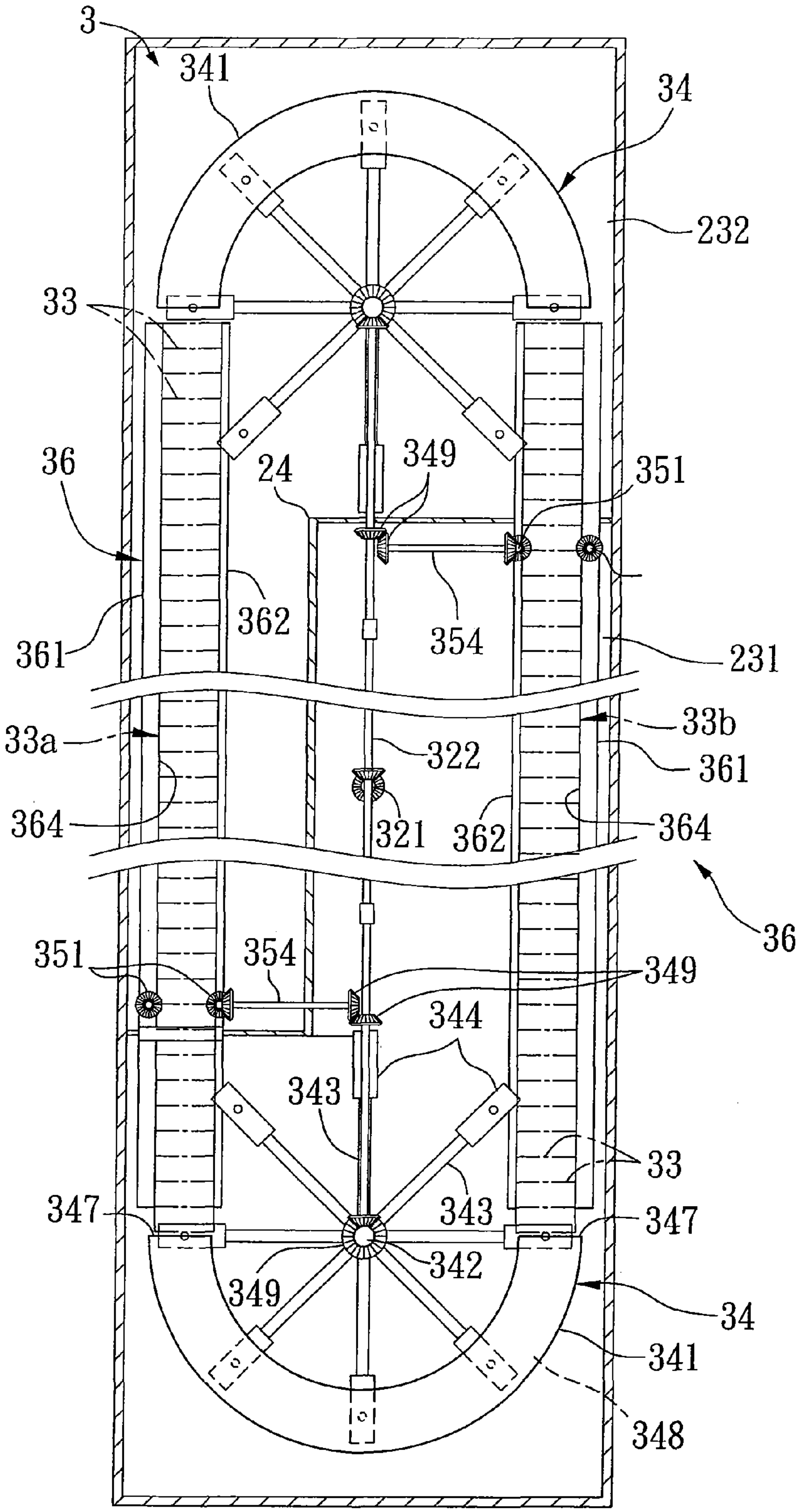
FIG. 3 is a fragmentary, partly sectional view of a high-torque generating mechanism of the first preferred embodiment.

Referring to FIGS. 1 and 3, the high-torque generating mechanism 3 includes left and right guiding rail units 36, a looped chain unit, upper and lower direction reversing guide units 34, a force-output shaft 321, and a gear train unit.

Figure 4:
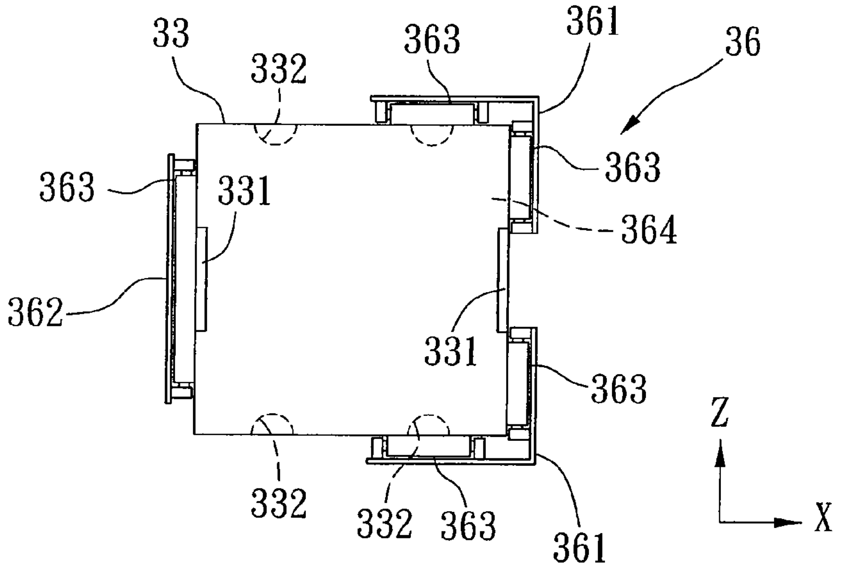
FIG. 4 is a top view of a guiding rail unit of the high-torque generating mechanism.

Referring to FIGS. 3 and 4, each of the left and right guiding rail units 36 is disposed in a respective one of the left and right columnar regions 292,291, and includes two L-shaped rails 361 spaced apart from each other in a second transverse direction (Z) transverse to the upright direction (Y) and the first transverse direction (X), a guide plate 362 cooperating with the rails 361 to define a respective one of left and right running routes 364 extending in the upright direction (Y), and a plurality of antifriction rollers 363 rollably mounted on the rails 361 and the guide plate 362.

The looped chain unit includes an array of weighted members 33 disposed one after another in series in a lengthwise direction. The array of weighted members 33 has leading and trailing subarrays (33*a*,33*b*) that are displaced from each other in the lengthwise direction and that are respectively placed along the left and right running routes 364. Specifically, each of the weighted members 33 is a metal block with a rectangular cross-section such that the leading subarray (33*a*) can be moved downwardly along the left running route 364, and the trailing subarray (33*b*) can be moved upwardly along the right running route 364.

The upper and lower direction reversing guide units 34 are disposed respectively in the upper and lower regions 27,28, and respectively define upper and lower guide routes 348 each of which interconnects the left and right running routes 364. The upper and lower guide routes 348 and the left and right running routes 364 cooperatively form a looped route. Specifically, referring to FIGS. 3 and 6, each of the upper and lower direction reversing guide units 34 includes two confining walls 341 which are spaced apart from each other in the second transverse direction (Z) to confine a respective one of the upper and lower guide routes 348, a driving shaft 342 which is revolvable relative to the surrounding wall 22 of the fluid tank 2 about a driving axis in the second transverse direction (Z), and a plurality of radial arms 343 which are angularly displaced from one another and which extend radially from the driving shaft 342 to terminate at carrier ends 344, respectively. The confining walls 341 extend in a circumferential direction about the driving axis to terminate at two openings 347 that face upwardly and that respectively correspond to exit and entry ends of the respective one of the upper and lower guide routes 348. In addition, each of the upper and lower guide routes 348 is configured to flare outward at the openings 347.

Thus, when the driving shaft 342 is revolved about the driving axis, the carrier ends 344 are moved to sequentially engage corresponding ones of the weighted members 33 at the entry end 347 so as to carry the corresponding ones of the weighted members 33 therewith, and to keep carrying until the carrier ends 344 pass through the exit end 347, thereby guiding the looped chain unit to move along a respective one of the upper and lower guide routes 348. The flared openings 347 are configured to facilitate passage of the carrier ends 344 of the radial arms 343 therethrough.

Figure 6:
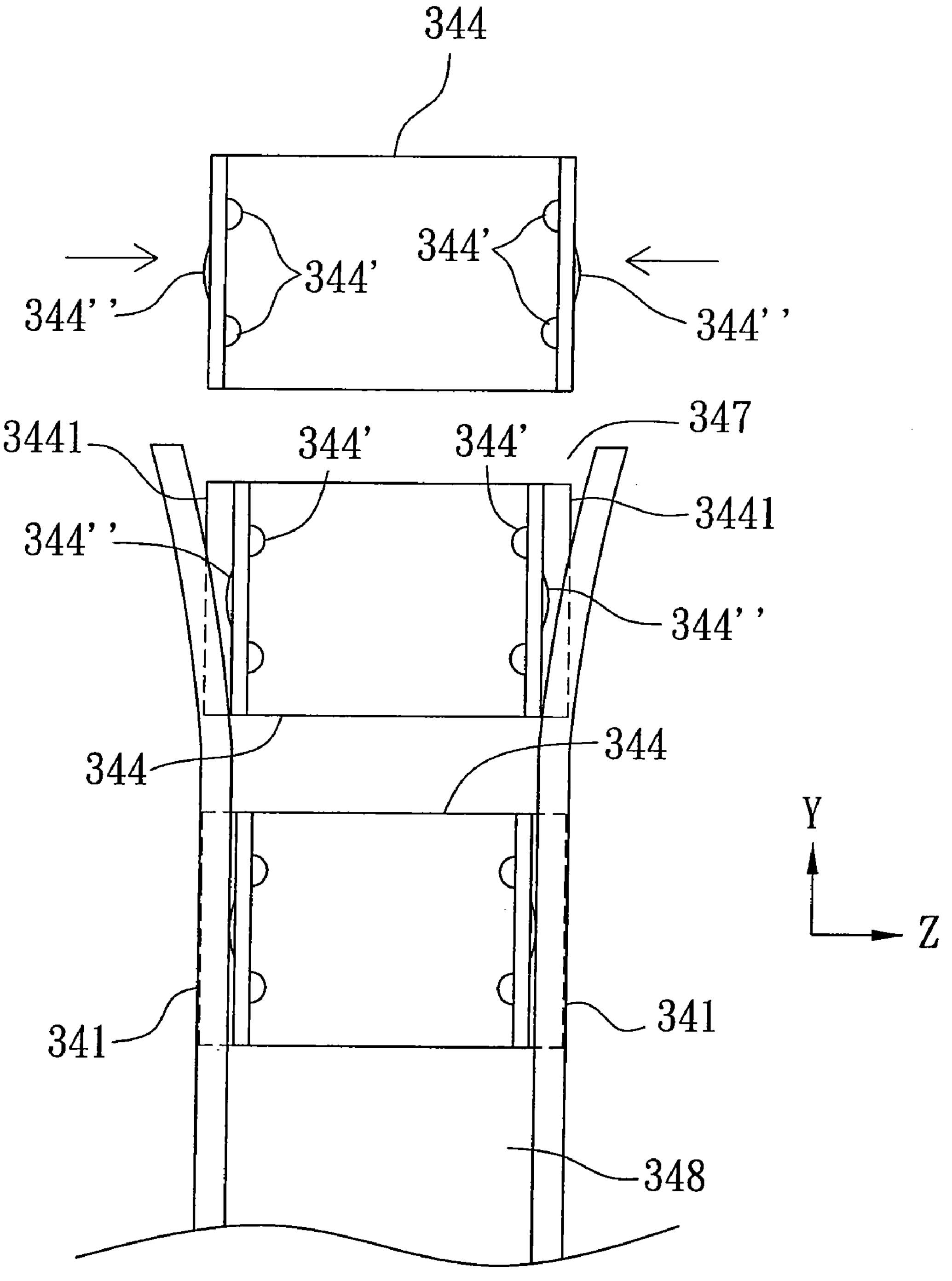
FIG. 6 is a fragmentary side view of a direction reversing guide unit of the high-torque generating mechanism.
Figure 8:
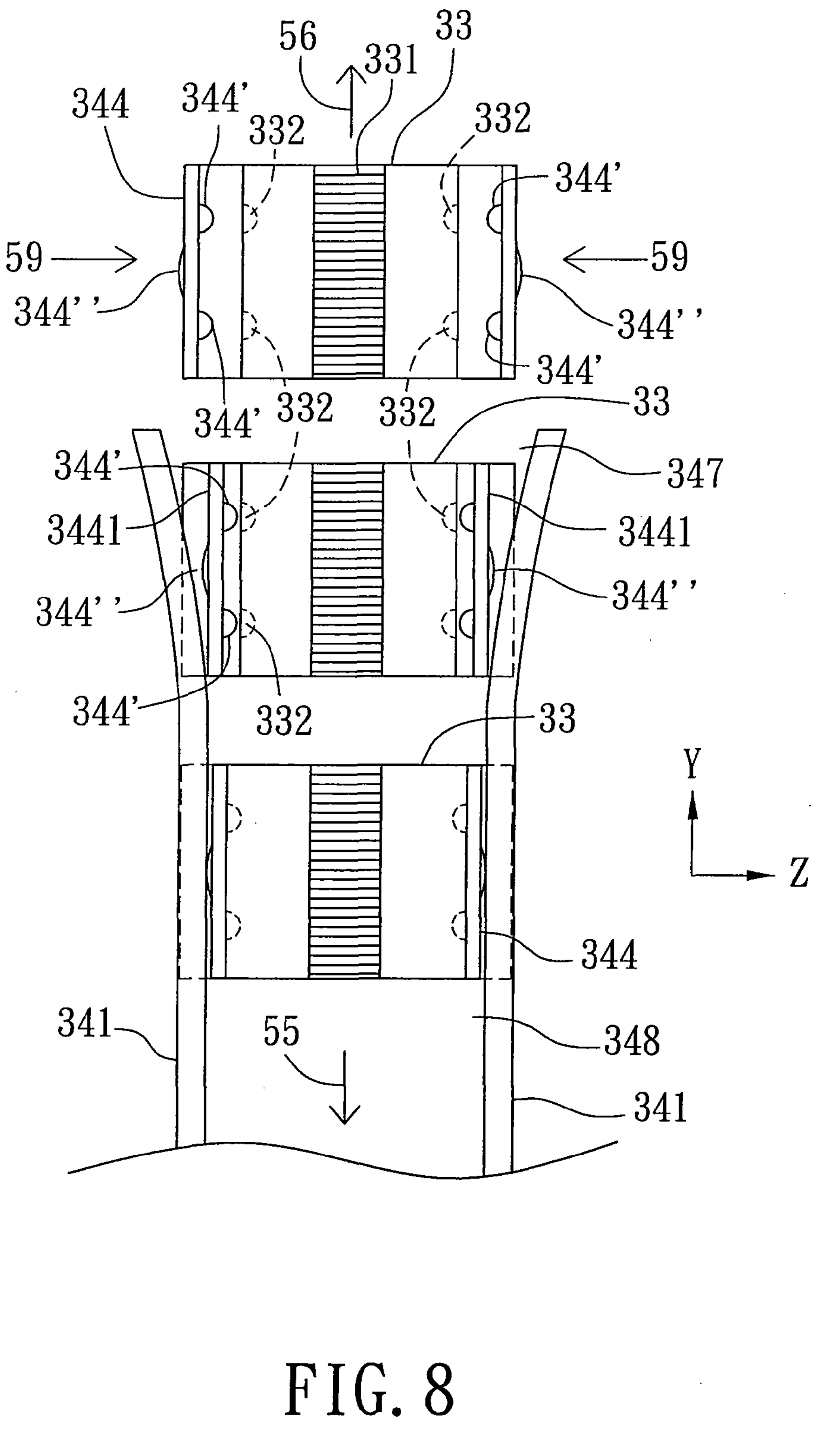
FIG. 8 is a fragmentary side view illustrating how weighted members are carried by the direction reversing guide unit in the state of operation.

Further, referring to FIGS. 6 and 8, each of the carrier ends 344 has a pair of flexible jaw bodies 3441. Each of the jaw bodies 3441 has a convexity 344" that is slidable along an inner surface of the respective confining wall 341, and a plurality of protrusions 344' that is configured to abut against the weighted members 33 in the second transverse direction (Z). Each of the weighted members 33 has a plurality of recesses 332 which are configured to mate with the protrusions 344', respectively. Hence, once the pair of flexible jaw bodies 3441 of each carrier end 344 is brought to move through the entry end 347 in the direction as indicated by arrow 55 of FIG. 8, the flexible jaw bodies 3441 thereof are forced by the confining walls 341 (in the direction as indicated by arrows 59 of FIG. 8) so that the protrusions 344' are matingly engaged in the recesses 332, thereby ensuring firm engagement between the respective radial arm 343 and the corresponding weighted member 33 when the looped chain unit is guided along the respective one of the upper and lower guide routes 348. Furthermore, once the carrier end 344 of each radial arm 343 is brought to move through the exit end 347 in the direction as indicated by arrow 56 of FIG. 8, the flexible jaw bodies 3441 thereof disengage from the corresponding weighted member 33 so as to permit the weighted member 33 to move on to a corresponding one of the left and right running routes 364.

It is noted that, alternatively, each of the carrier ends 344 may be configured to have recesses, and each of the weighted members 33 may be configured to have protrusions for matingly engaging the recesses in the respective carrier end 344.

The force-output shaft 321 is rotatably mounted on the fluid tank 2 about a revolving axis oriented in the second transverse direction (Z).

Referring to FIG. 7, the gear train unit is disposed to couple one of the leading and trailing subarrays (33*a*, 33*b*) to the force-output shaft 321 such that a translational force of one of the downward and upward movements of the leading and trailing subarrays (33*a*, 33*b*) is taken up at a corresponding one of the right and left running routes 364 to drive the force-output shaft 321 to revolve about the revolving axis.

Figure 5:
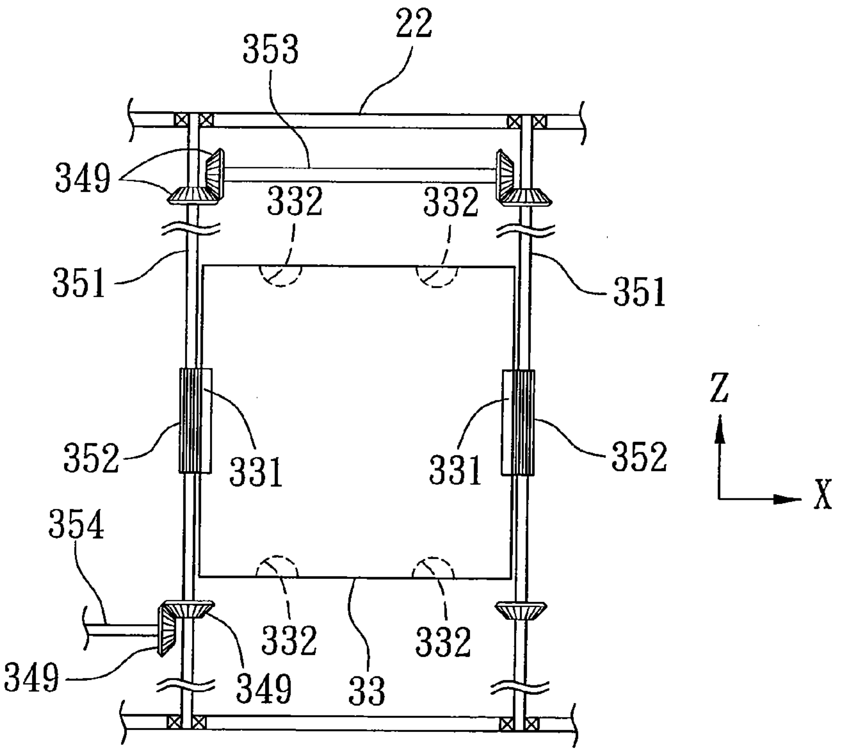
FIG. 5 is a top view of a gear train unit of the high-torque generating mechanism.

Specifically, referring to FIGS. 3, 5, and 7, the gear train unit includes two pairs of rotary shafts 351 disposed in the sub-chamber 29, two synchronizing shafts 353, an upright shaft 322, and two transmitting shafts 354.

The rotary shafts 351 of each pair extend along rotary axes in the second transverse direction (Z), and are each provided with a pinion portion 352. Each of the weighted members 33 has two rack portions 331 which are disposed to mesh with the pinion portions 352 of the rotary shafts 351 of each pair, respectively, so as to rotate the rotary shafts 351 about the respective rotary axes with a respective one of the downward and upward movements of the leading and trailing subarrays (33*a*,33*b*). Each of the synchronizing shafts 353 is coupled to the rotary shafts 351 of each pair by bevel gears 349 so as to synchronize revolution of the rotary shafts 351. The upright shaft 322 is revolvable about an upright axis, extends along the upright axis to terminate at upper and lower ends that are disposed in the upper and lower regions 27,28, respectively, and is coupled to the force-output shaft 321 by bevel gears 349 such that the force-output shaft 321 is driven to revolve about the revolving axis when the upright shaft 322 is revolved about the upright axis. Each of the transmitting shafts 354 extends in the first transverse direction (X) and couples one of the rotary shafts 351 of each pair to the upright shaft 322 by bevel gears 349 so as to transmit a rotational force of synchronized revolution of the rotary shafts 351 to drive the upright shaft 322 to revolve about the upright axis, thereby revolving the force-output shaft 321. Further, the driving shafts 342 of the upper and lower direction reversing guide units 34 are coupled to the upper and lower ends of the upright shaft 322, respectively, by bevel gears 349 to be revolvable with the upright shaft 322.

Referring to FIG. 7, a barrier member 42 is disposed between the first and second compartments 231,232, and is configured to prevent the fluid 200 in the reservoir 28 from flowing into the left columnar region 292.

Referring to FIGS. 1 and 7, in use, by operation of the fluid pump 4 to move the fluid 200 in the reservoir 28 toward the right columnar region 291, the fluid level in the right columnar region 291 can be raised to be higher than that in the left columnar region 292. Thus, referring to FIGS. 5 and 7, a buoyant force is generated in the right columnar region 291 to lessen the weight of the trailing subarray (33*b*) disposed along the right running route 364 so as to render the leading subarray (33*a*) heavier than the trailing subarray (33*b*), thereby inducing synchronized downward and upward movements of the leading and trailing subarrays (33*a*,33*b*), as indicated by arrows 53,51 in FIG. 7. At this time, referring to FIG. 5, by virtue of the engagement between the rack portions 331 and the pinion portions 352, the rotary shafts 351 are driven to revolve about the respective rotary axes, and in turn drive the upright shaft 322 to revolve about the upright axis by means of the transmitting shafts 354, thereby driving the driving shafts 342 to revolve to result in movement of the carrier ends 344 of each of the upper and lower direction reversing guide units 34 along the respective one of the upper and lower guide routes 348. Thus, the weighted members 33 can be moved effortlessly and successively in the lengthwise direction, i.e., in the direction as indicated by the arrows 51 to 54 of FIG. 7.

Referring to FIG. 7, the force-output shaft 321 is driven to revolve by the upright shaft 322 for providing a high torque to a desired object, such as a machine, a motor, an electric generator, etc. Moreover, part of electric power generated by the electric generator used with the present invention can be supplied to the fluid pump 4 to maintain the fluid 200 in the fluid tank 2 at a desired level.

As illustrated, by operation of the fluid pump 4 of the present invention to maintain the desired fluid level in the fluid tank 2, the array of weighted members 33 can be displaced and moved in a cyclical fashion to provide a high torque for driving rotation of the force-output shaft 321 so as to output rotational energy to a desired object or to enable generation of electric power by a generator in a steady and efficient manner.

Figure 9:
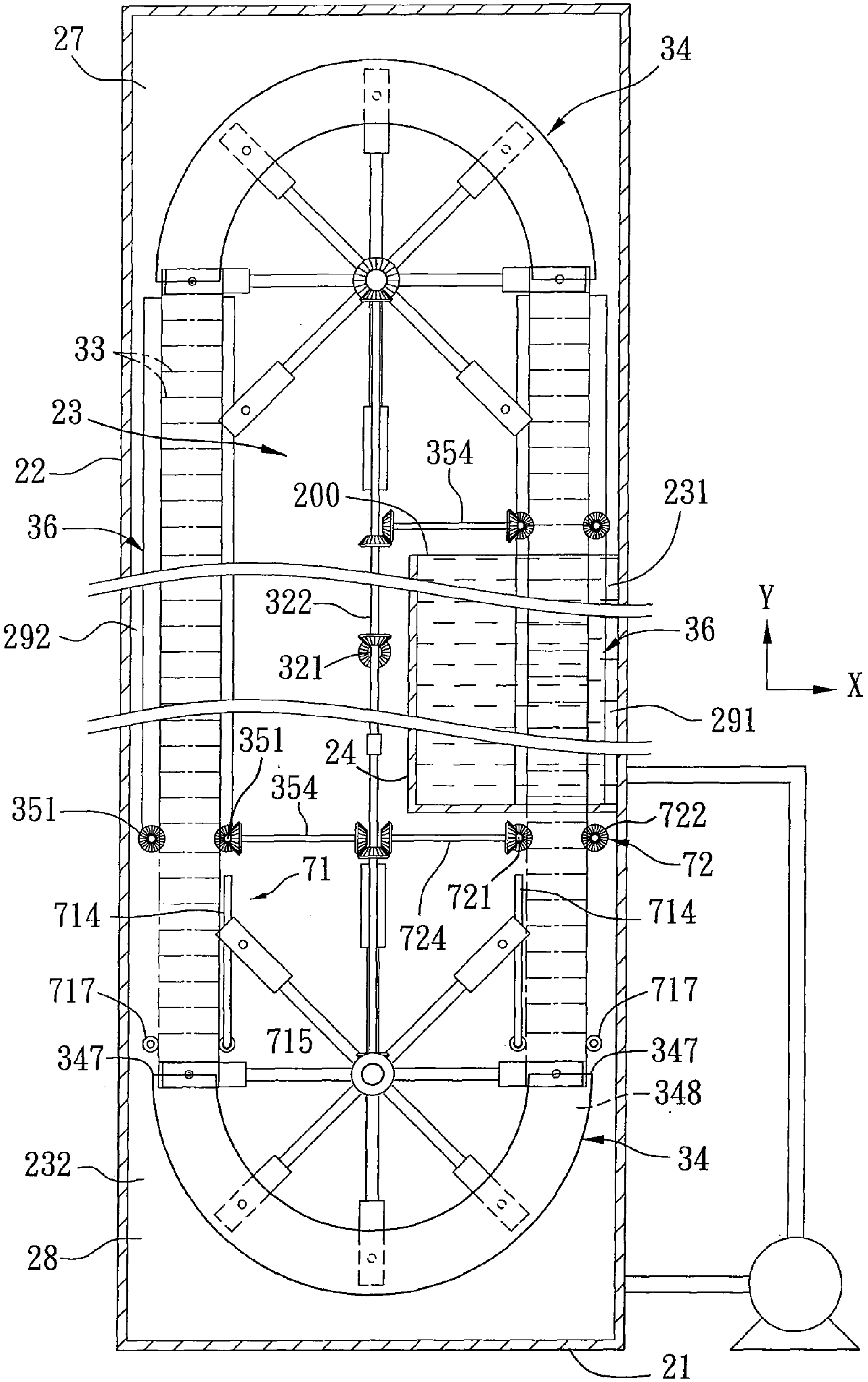
FIG. 9 is a fragmentary, partly sectional view of the second preferred embodiment of a high torque output drive system according to this invention.

Referring to FIG. 9, the second preferred embodiment of a high torque output drive system according to this invention is similar to the previous embodiment in construction. In this embodiment, the system further comprises left and right auxiliary guiding and driving units 71,72.

Figure 10:
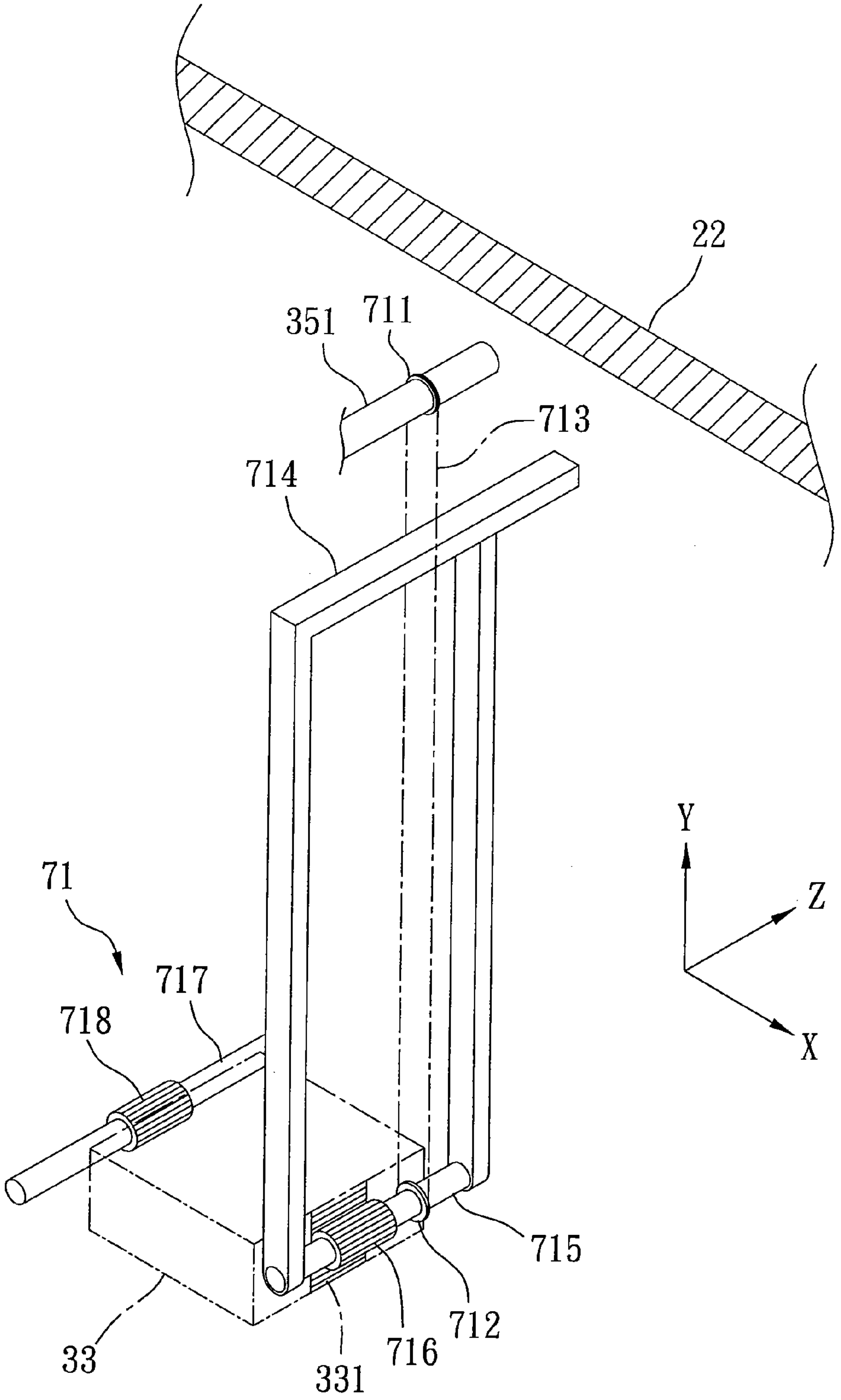
FIG. 10 is a perspective view of a left auxiliary guiding and driving unit of the second preferred embodiment.

As shown in FIG. 10, the left auxiliary guiding and driving unit 71 includes a frame 714 which is mounted on the surrounding wall 22 and which extends towards the bottom tank wall 21, a left journalled shaft 715 which is journalled on the frame 714 and adjacent to the entry end 347 and which has a gear portion 716, a left driven shaft 717 which is pivotally mounted on the surrounding wall 22 and which has a gear portion 718 such that the rack portions 331 of each weighted member 33 can mesh with the gear portions 716,718, respectively, two chain wheels 711, 712 mounted respectively on the corresponding rotary shaft 351 and the left journalled shaft 715, and a chain 713 trained on the chain wheels 711,712 so as to synchronize revolution of the shafts 351,715.

Figure 11:
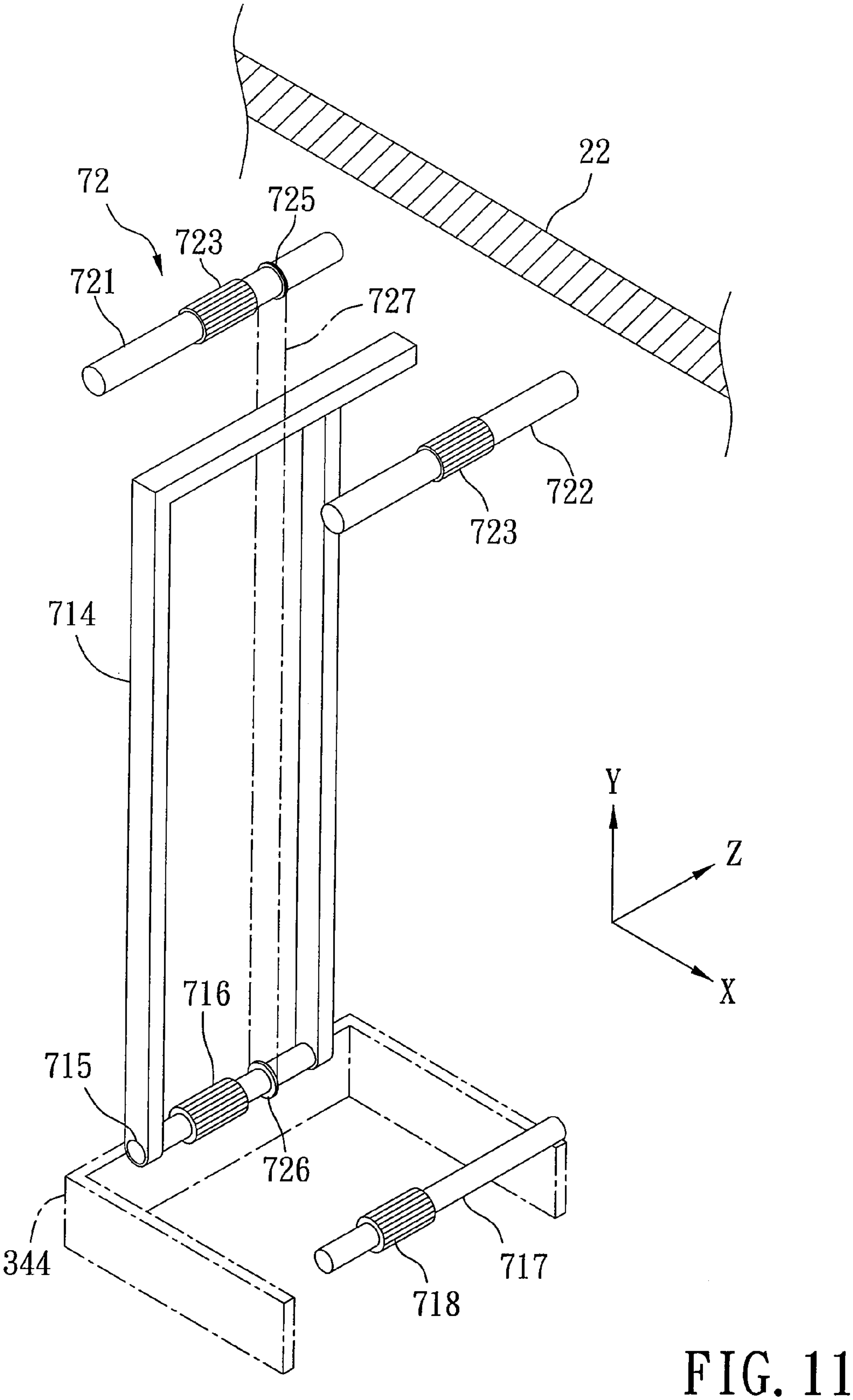
FIG. 11 is a perspective view of a right auxiliary guiding and driving unit of the second preferred embodiment.

As shown in FIG. 11, the right auxiliary guiding and driving unit 72 includes a frame 714 and right journalled and driven shafts 715,717 which are similar to the frame 714 and the left journalled and driven shafts 715,717 of the left auxiliary guiding and driving unit 71, first and second rotating shafts 721,722 which are pivotally mounted on the surrounding wall 22 and which have gear portions 723 to mesh respectively with the rack portions 331 of each weighted member 33, an auxiliary transmitting shaft 724 which is disposed to couple the first rotating shaft 721 to the upright shaft 322 so as to transmit a rotational force of the upright shaft 322 to the first rotating shaft 721 such that the first rotating shaft 721 revolves in synchronization with the upright shaft 322, two chain wheels 725,726 which are mounted respectively on the first rotating shaft 721 and the right journalled shaft 715, and a chain 727 which is trained on the chain wheels 725,726 so as to synchronize revolution of the shafts 721,715.

In this embodiment, the partition wall 24 is configured to partition the upright fluid chamber 23 into the first compartment 231 which includes the right columnar region 291, and the second compartment 232 which includes the upper region 27, the left columnar region 292, and the lower region 28. Since the upper and lower direction reversing guide units 34 are disposed in the second compartment 232, liquid resistance acted thereon can be minimized so as to increase the output torque of the force-output shaft 321. Furthermore, by virtue of arrangement of the left and right auxiliary guiding and driving units 71,72, the movement of the array of weighted members 33 can be smoother.

Figure 12:
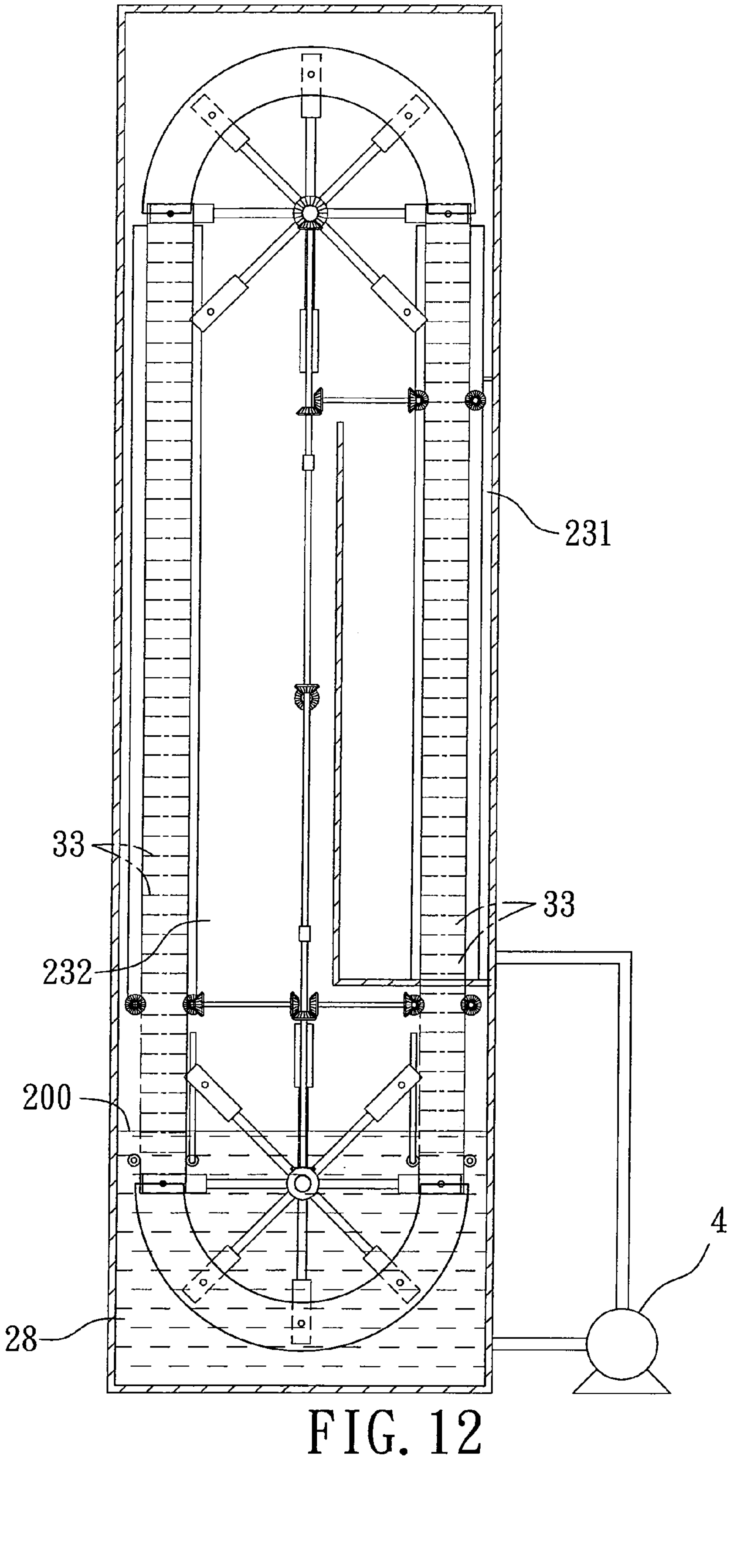
FIG. 12 is a partly sectional view of the second preferred embodiment in a temporarily stopped state.

Referring to FIG. 12, when the operation of the fluid pump 4 is stopped, the liquid 200 in the first compartment 231 can return to the reservoir 28 for next use.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A high torque output drive system comprising:

a fluid tank including an upper region, a lower region which is disposed opposite to said upper region in an upright direction, and which serves as a reservoir for storing a fluid, and a sub-chamber interposed between said upper and lower regions, and including left and right columnar regions which are opposite to, and are in non-communication with each other in a first transverse direction relative to the upright direction, and which are configured to be in fluid communication with said reservoir respectively, said left and right columnar regions being configured to define left and right running routes, respectively;

a looped chain unit including an array of weighted members disposed one after another in series in a lengthwise direction, said array of weighted members having leading and trailing subarrays that are displaced from each other in the lengthwise direction;

upper and lower direction reversing guide units disposed respectively in said upper and lower regions, and respectively defining upper and lower guide routes each of which interconnects said left and right running routes, and each of which has entry and exit ends, said upper and lower direction reversing guide units being configured such that, once said looped chain unit is carried forward by said upper and lower direction reversing guide units to move along said upper and lower guide routes, said leading and trailing subarrays are respectively placed along said left and right running routes;

a fluid pump operable to move the fluid in said reservoir towards said right columnar region such that a fluid level in said right columnar region is higher than that in said left columnar region and such that a buoyant force is generated in said right columnar region as a result of a difference in fluid level between said left and right columnar regions to lessen weight of said trailing subarray disposed along said right running route so as to render said leading subarray heavier than said trailing subarray, thereby inducing synchronized downward and upward movements of said leading and trailing subarrays;

a force-output shaft rotatably mounted on said fluid tank about a revolving axis oriented in a second direction transverse to both the first transverse direction and the upright direction; and a gear train unit configured to couple one of said leading and trailing subarrays to said force-output shaft such that a translational force of one of the downward movement of said leading subarray and the upward movement of said trailing subarray is taken up at a corresponding one of said right and left running routes to drive said force-output shaft to revolve about the revolving axis.

2. The high torque output drive system according to claim 1, wherein said gear train unit includes an upright shaft which is revolvable about an upright axis transverse to the revolving axis of said force-output shaft, which extends along the upright axis to terminate at upper and lower ends that are disposed in said upper and lower regions, respectively, and which is coupled to said force-output shaft such that said force-output shaft is driven to revolve about the revolving axis when said upright shaft is revolved about the upright axis.

3. The high torque output drive system according to claim 2, wherein each of said upper and lower direction reversing guide units includes a driving shaft which is revolvable relative to said fluid tank about a driving axis in the second transverse direction, and which is coupled to and revolved with a respective one of said upper and lower ends of said upright shaft, and a plurality of radial arms which are angularly displaced from one another and which extend radially from said driving shaft to terminate at carrier ends, respectively, such that, when said driving shaft is revolved about the driving axis, said carrier ends are moved to sequentially engage said looped chain unit at said entry end so as to carry said looped chain unit therewith and to keep carrying said looped chain unit until said carrier ends pass through said exit end, thereby guiding said looped chain unit to move along a respective one of said upper and lower guide routes.

4. The high torque output drive system according to claim 3, wherein each of said upper and lower direction reversing guide units further includes two confining walls which are spaced apart from each other in the second transverse direction to confine a respective one of said upper and lower guide routes, and which extend in a circumferential direction about the driving axis to terminate at two openings that face upwardly and that respectively correspond to said exit and entry ends, each of said upper and lower guide routes being configured to flare outward at said openings to facilitate passage of said carrier ends of said radial arms of a respective one of said upper and lower direction reversing guide units therethrough.

5. The high torque output drive system according to claim 4, wherein each of said weighted members has a plurality of recesses, each of said carrier ends having a pair of flexible jaw bodies configured to be forced by said confining walls to abut against a corresponding one of said weighted members in the second transverse direction, and a plurality of protrusions configured to respectively and matingly engage said recesses in the corresponding one of said weighted members once said flexible jaw bodies are brought to move through said entry end and are forced by said confining walls to abut against the corresponding one of said weighted members, thereby ensuring firm engagement between each of said radial arms and the corresponding one of said weighted members when said looped chain unit is guided along the respective one of said upper and lower guide routes.

6. The high torque output drive system according to claim 2, wherein said gear train unit further includes two pairs of rotary shafts disposed in said sub-chamber, said rotary shafts of each pair being revolvable with the downward and upward movements of said leading and trailing subarrays about respective rotary axes in the second transverse direction, two synchronizing shafts, each disposed to synchronize revolution of said rotary shafts of each pair, and two transmitting shafts, each disposed to transmit a rotational force of synchronized revolution of said rotary shafts to drive said upright shaft to revolve about the upright axis.

7. The high torque output drive system according to claim 6, wherein each of said rotary shafts is provided with a pinion portion, each of said weighted members having two rack portions which are disposed to mesh with said pinion portions of said rotary shafts of each pair so as to rotate said rotary shafts with the downward and upward movements of said weighted members.

8. The high torque output drive system according to claim 1, wherein said fluid tank has left and right rail units which are respectively disposed in said left and right columnar regions, and which extend in the upright direction to respectively define said left and right running routes, each of said left and right rail units having a plurality of antifriction rollers rollably mounted thereon so as to facilitate movement of a respective one of said leading and trailing subarrays.

9. The high torque output drive system according to claim 1, wherein said fluid tank has top and bottom tank walls disposed opposite to each other in the upright direction, and a surrounding wall interposed between said top and bottom tank walls, said surrounding wall having a plurality of transparent windows to permit viewing of an interior of said fluid tank.

10. The high torque output drive system according to claim 1, wherein each of said weighted members is a metal block with a rectangular cross-section.

11. The high torque output drive system according to claim 7, further comprising:

a left auxiliary guiding and driving unit disposed between said entry end of said lower guide route and said rotary shafts of one pair, and which includes left journalled and driven shafts that respectively have gear portions configured to mesh with said rack portions of each of said weighted members, said left journalled shaft being coupled to said rotary shafts so as to revolve in synchronization with said rotary shafts; and a right auxiliary guiding and driving unit disposed between said rotary shafts of the other one pair and said exit end of said lower guide route, and which includes first and second rotating shafts that respectively have gear portions configured to mesh with said rack portions of each of said weighted members, and an auxiliary transmitting shaft disposed to couple said first rotating shaft to said upright shaft to transmit a rotational force of said upright shaft to said first rotating shaft such that said first rotating shaft revolves in synchronization with said upright shaft.

12. The high torque output drive system according to claim 11, wherein said right auxiliary guiding and driving unit further includes right journalled and driven shafts which respectively have gear portions configured to mesh with said rack portions of each of said weighted members, two chain wheels which are mounted respectively on said first rotating shaft and said right journalled shaft, and a chain which is trained on said chain wheels so as to synchronize revolution of said first rotating shaft and said right journalled shaft.

* * * * *